(No Model.)
N. GILROY.
LEMON JUICE EXTRACTOR.
No. 587,197. Patented July 27, 1897.
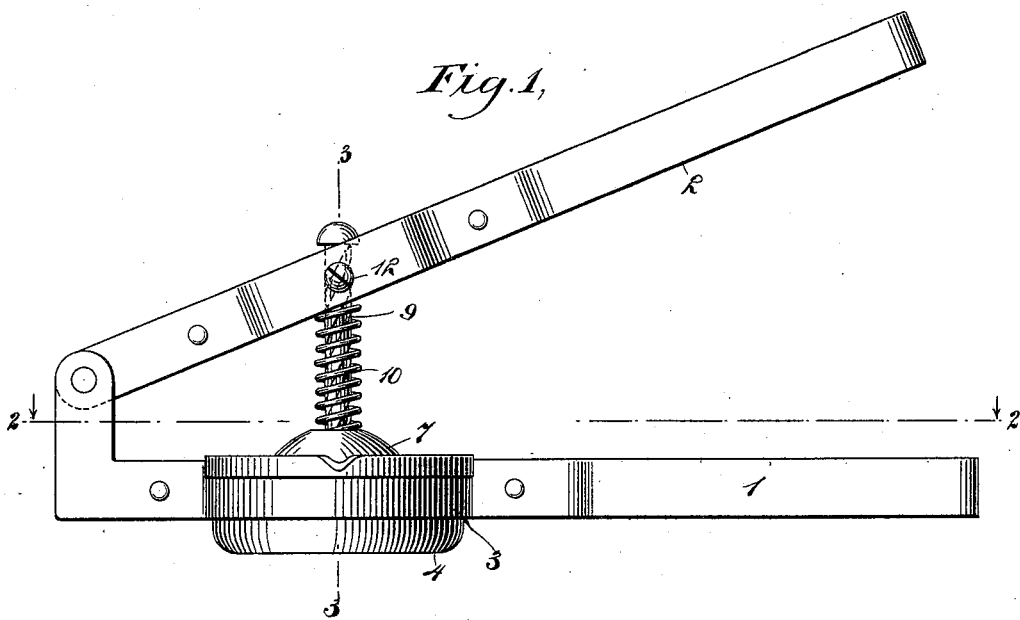
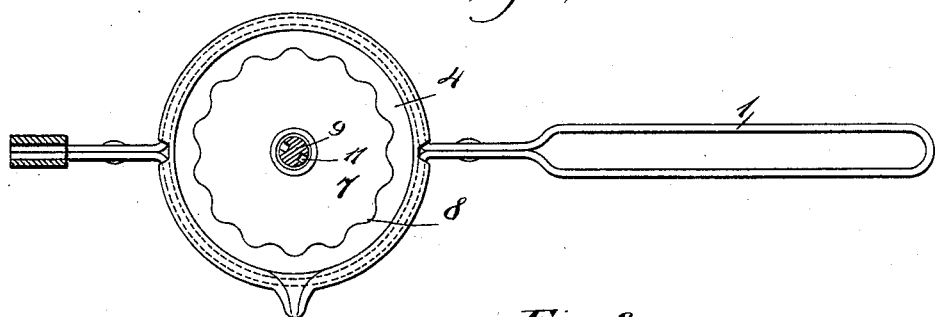
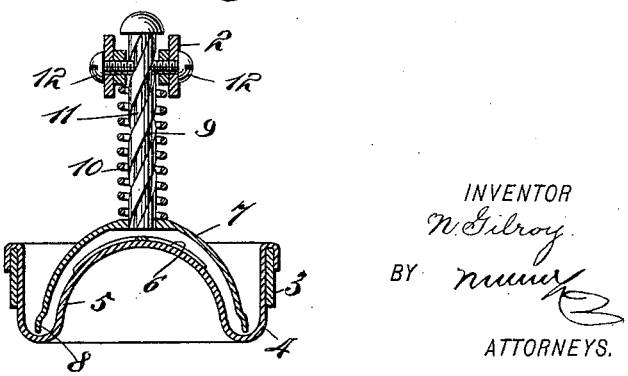
WITNESSES:
Edward Thorpe
C. R. Ferguson
INVENTOR
N. Gilroy
BY
ATTORNEYS.

UNITED STATES PATENT OFFICE.

NICHOLAS GILROY, OF NEW YORK, N. Y.

LEMON-JUICE EXTRACTOR.

SPECIFICATION forming part of Letters Patent No. 587,197, dated July 27, 1897.

Application filed March 23, 1897. Serial No. 628,849. (No model.)

*To all whom it may concern:*

Be it known that I, NICHOLAS GILROY, of New York city, in the county and State of New York, have invented a new and Improved Lemon-Juice Extractor, of which the following is a full, clear, and exact description.

This invention relates to devices for extracting the juice from lemons. Lemon-squeezers or juice-extractors have heretofore been made in which a lever is operated to force half a lemon down upon a dome-shaped support within a juice-receiving cup; but in this class of devices there is a direct downward movement only of the lemon, and consequently the juice is not only extracted from the body portion of the lemon, but the bitter juices are squeezed from the inner surface of the lemon-skin.

The object of my invention is to provide a construction whereby the plunger in its movement toward the dome-shaped support will have a rotary motion, thus imparting a rotary motion to the lemon, so that the juice will be extracted from the body portion of the lemon by a rubbing motion on the dome-shaped support and without extracting the bitter juice from the skin to mingle with the juice of the body portion.

I will describe a lemon-juice extractor embodying my invention and then point out the novel features in the appended claim.

Reference is to be had to the accompanying drawings, forming a part of this specification, in which similar characters of reference indicate corresponding parts in all the views.

Figure 1 is a side elevation of a lemon-juice extractor embodying my invention. Fig. 2 is a section on the line 2 2 of Fig. 1, and Fig. 3 is a section on the line 3 3 of Fig. 1.

The device comprises two levers 1 and 2, pivotally connected together, so that one may move relatively to the other. The lever 1 has a ring 3, which forms a seat for a juice-cup 4, which may be made of any suitable material—such, for instance, as porcelain or glass, or it may be made of metal. Extended upward from the bottom of the cup 4 is a dome-shaped support 5. This will preferably be made integral with the cup, and it will be provided on its upper portion with smooth radial ribs 6.

The lever 2 supports a plunger 7, which is concaved or made to conform somewhat to the shape of the dome 5, but is somewhat larger than said dome. The edge of this plunger 7 is scalloped or serrated, as indicated at 8, so as to engage somewhat into the outer skin of a lemon. From the plunger 7 a stem 9 extends upward through an opening in the lever 2, and arranged around said stem between the plunger and the lever 2 is a coiled spring 10. The stem 9 is provided throughout its length with a spiral groove 11, with which projections on the inner side of the opening through the lever 2 engage. These projections are shown in the form of screws 12, passing through the opposite walls of the opening through the lever 2.

In operation the levers 1 and 2 will be sufficiently separated to allow half a lemon to be placed upon the dome-shaped support 5, and then the plunger 7 will be brought down upon the outer surface of the lemon. Then by forcing the levers toward each other the projections 12 will cause the plunger 7 to rotate and carry the lemon with it while the said lemon is being forced down upon the support. As the support 5 is stationary the lemon will be rotated relatively to the support, and thus the juice will be extracted by a rubbing action, and this rubbing action will have no effect to extract the bitter juice from the skin of the lemon. Upon releasing the lever 2 the spring 10 will cause the parts to assume their normal position. The juice obviously will be collected in the cup 4, and after removing the lemon from which the juice has been extracted the juice may be poured from the cup.

Having thus described my invention, I claim as new and desire to secure by Letters Patent—

A lemon-juice extractor, comprising two hand-levers pivotally connected together, a juice-cup supported by one of the levers, a dome-shaped support in said cup, a concaved plunger having a scalloped edge, a spirally-grooved stem on the plunger extended through an opening in one of the hand-levers, projections from opposite walls of the opening extended into said groove and a spring surrounding the stem bearing at one end on the lever and at the other end on the plunger, substantially as specified.

NICHOLAS GILROY.

Witnesses:
JNO. M. RITTER,
C. R. FERGUSON.